Oct. 23, 1923.

F. W. BERNAU 1,471,770

LOCKING MEANS FOR ACCUMULATOR CONTROLS

Filed June 17, 1922     2 Sheets-Sheet 1

Inventor,
Frederick W. Bernau
By    [signature] Atty.

Oct. 23, 1923.   1,471,770
F. W. BERNAU
LOCKING MEANS FOR ACCUMULATOR CONTROLS
Filed June 17, 1922   2 Sheets-Sheet 2
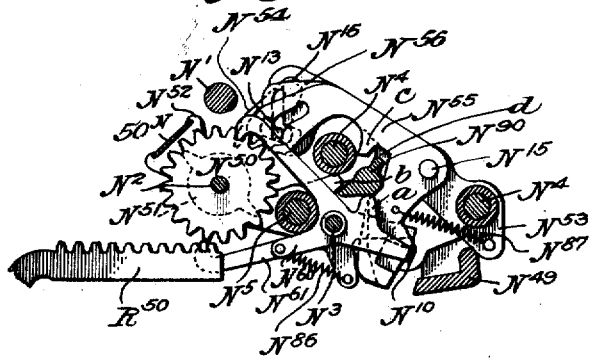
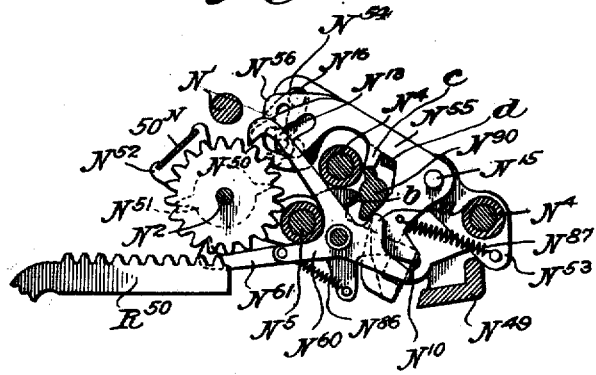
Inventor,
Frederick W. Bernau
By Patented Oct. 23, 1923.

1,471,770

UNITED STATES PATENT OFFICE.

FREDERICK W. BERNAU, OF NEWARK, NEW JERSEY, ASSIGNOR TO ELLIS ADDING TYPEWRITER COMPANY, OF NEWARK, NEW JERSEY, A CORPORATION OF NEW JERSEY.

LOCKING MEANS FOR ACCUMULATOR CONTROLS.

Application filed June 17, 1922. Serial No. 568,949.

*To all whom it may concern:*

Be it known that I, FREDERICK W. BERNAU, a citizen of the United States, residing at Newark, in the county of Essex and State of New Jersey, have invented certain new and useful Improvements in Locking Means for Accumulator Controls, of which the following is a specification.

This invention relates to locking means for the shift bar whose position determines whether addition or substraction will be performed in the well known "Ellis" adding and substracting machine.

In the patent to Halcolm Ellis, No. 1,203,863, dated November 7, 1916, for "Mechanical calculator" there is set forth and claimed a "shift bar" which is adapted to be turned one way or the other, when the machine is operated, according to whether the machine is set for addition or subtraction. This shift bar, in turn, controls the operation of certain pivoted cam plates and a "carrying" pivoted detent segment operated thereby in such manner that those cam plates which control the subtracting operation will be locked by the shift bar when the machine is set for addition and, on the other hand, those which control the operation of substraction will be released and the adding cam plate locked when the machine is set for subtraction. Thus, as predetermined by the setting of the machine either for addition or for subtraction, the shift bar will be turned when the machine is operated and the carrying mechanism will be arranged for operation to effect carrying for that operation of the machine.

My present invention relates to means for positively locking or latching the shift bar in either the "adding" or the "subtracting" position so that it will be impossible for it to accidentally move when it has been set, thus preventing false operation or false result in calculation occuring from this cause and insuring retention of the shift bar in its previously set position until the machine has performed its cycle of operations, or until it is desired to move the shift bar to its other set position.

A practical embodiment of locking or latching means for the shift bar comprises the pair of locking latches hereinafter described and which are shown in the accompanying drawings. One of these latches locks the shift bar when it is set for addition, as predetermined by the operation of the setting of a suitable key of the machine; the other latch locks the shift bar when it is set, for subtraction, as predetermined by the operation of a suitable key. The latches are spring-actuated and adapted for independent movement under the actuation of their springs, one of the latches being adapted to drop in front of the shift bar and the other to drop in the rear thereof but only one latch being effective at a given time. The two latches are subject to the control of the "carrying bar" whose construction and operation is set forth in the Ellis Patent No. 1,203,863, the carrying bar being the instrumentality which cooperates with the detent-operating cam plates as explained in that patent.

It is unnecessary to employ more than one pair of locking latches in carrying out the present invention. This pair of latches may be pivoted to one of the fixed "order plates" described in the aforesaid patent but they are conveniently pivotally mounted on the order plate representing the "units" position as they are more accessible in that position. Preferably, the pair of locking latches is pivoted in line with the pivots of the carrying cam plates.

Reference is to be had to Ellis Patent No. 1,203,863, November 7, 1916, for a full disclosure of the machine on which the present improvements are used as I have only shown so much of the shift bar and the other members of the adding and subtracting accumulator of that patent as will afford a clear understanding of the manner in which the present improvements are applied thereto and to illustrate the "principle" and operation of said improvements.

I am aware that changes might be resorted to in carrying out the principle of the present improvements and I do not limit myself to the specific embodiment of the shift bar lock constituting the present invention, except where specified in the claims:

In the accompanying drawings:

Fig. 6 is a detail view showing the adding and subtracting accumulator of Patent No. 1,203,863, the shift bar being set for addition in the position shown in Fig. 1, the parts being in normal position; and Fig. 7 is a similar view, the shift bar being turned to set the mechanism for subtraction, the said shift bar then being in the position shown in Fig. 3.

By comprising the showing of Figs. 1 and 6, and Figs. 3 and 7, it will be seen that the present improvements do not modify the construction of the adding and subtracting accumulator of the Ellis Patent No. 1,203,863 but that the latching or locking device is an additional means which does not modify the operation of the adding and subtracting accumulator but supplements it and insures its accuracy.

It is to be understood that while the locking means constituting the present invention is shown and described in connection with the adding and subtracting accumulator of Patent No. 1,203,863 and specific reference made to that patent, nevertheless the present improvements are adapted for use in connection with the shift bar $N^{90}$ of any embodiment of the Ellis machine employing such a shift bar whether heretofore patented or having to do with other improvements relating to an adding and subtracting accumulator having such a shift bar for which application for patent may be hereafter made.

Referring first to Figures 6 and 7, an understanding may be had of the adding and subtracting accumulator, the shift bar, and carrying bar thereof as set forth in the Ellis Patent No. 1,203,863 of November 7, 1916.

Figures 1, 3:
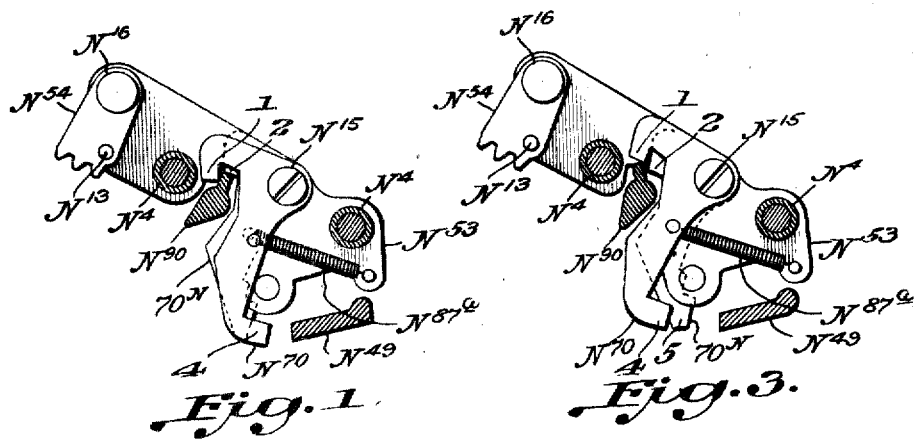
Figure 1 is a detail section through the connecting rods, the carrying bar, and shift bar of the adding and substracting accumulator of Patent No. 1,203,863, other parts being omitted, showing the two locking latches pivoted to one of the order plates, the shift bar being shown as latched in position for addition, and the carrying bar being in normal position.
Fig. 3 is a similar view, showing the shift bar turned to subtracting position and latched by the subtracting locking latch, the carrying bar having returned to normal position.
Figures 2, 4, 5:
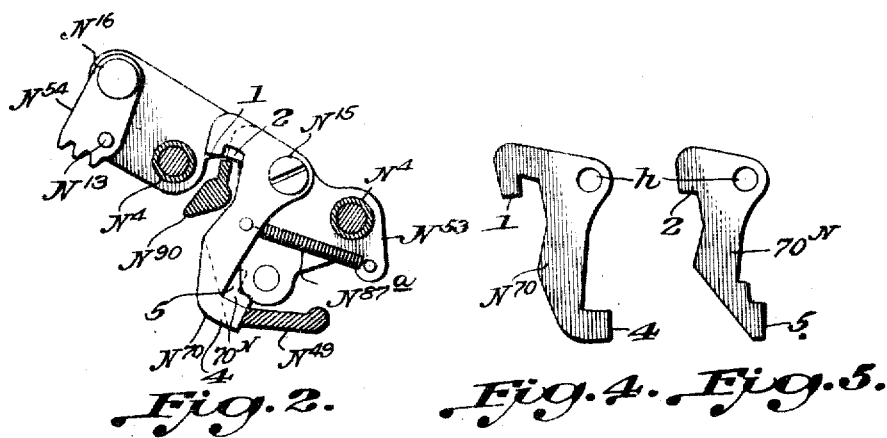
Fig. 2 is a similar view, showing the carrying bar in advanced position and in engagement with both locking latches for the purpose of releasing them from the shift bar so that the shift bar may be turned to the subtracting position of Fig. 3.
Fig. 4 is a detail side view of the adding locking latch.
Fig. 5 is a similar view of the subtracting locking latch.

In Figures 1, 2 and 3 there is shown the shift bar and carrying bar of Figures 6 and 7 and the carrying detent segment set forth in the aforesaid patent. Figs. 1, 2 and 3 illustrate the manner in which the locking latches constituting the present invention, are mounted on one of the order plates and are related to the shift bar and carrying bar.

Referring to Figs. 6 and 7, it will be understood that only one unit of the adding and subtracting accumulator is disclosed and that the mechanism is duplicated for the different orders or columns of the machine, except for the units order, whereas the shift bar and carrying bar are in section.

Between certain side frames of the machine there extend horizontal shafts $N^4$ which have suitable spacing collars and support the order plates $N^{53}$.

The adding wheels $N^{50}$ are mounted on a horizontal shaft $N^2$ which extends through the plates $N^{52}$, the end members of the series of plates $N^{52}$ being pivotally mounted. A plate $50^N$ is mortised into the ends of the plates $N^{52}$ and serves as a brace for maintaining all of the plates in proper position, and there is thus provided a rockable frame carrying the adding wheels $N^{50}$. The rocking of this frame causes the wheels $N^{50}$ to engage or disengage the racks or actuators $R^{50}$ whose movement is controlled by the keys of the machine and the operating mechanism thereof.

Means is provided for swinging the frame carrying the wheels $N^{50}$, as explained in Patent No. 1,203,863.

Mounted in the wheel carrying frame and upon the shaft $N^3$ are a series of hooks $N^{60}$ and $N^{61}$ whose points are adapted to come into the plane of the two-pointed cam $N^{51}$ secured to each of the wheels $N^{50}$. Springs $N^{86}$ actuate the hooks $N^{60}$ and $N^{61}$ so that their points tend to move toward the center of the cam $N^{51}$. The shape of the point of hook $N^{60}$ is such that in rotating the cam $N^{51}$ in a direction so that it strikes the point of the hook $N^{60}$ while moving in a direction toward the shaft $N^3$, the hook $N^{60}$ will rise up and a point of the cam $N^{51}$ will pass underneath it. On the other hand, if the rotation of the cam $N^{51}$ is in the reverse direction so that it engages the hook $N^{60}$ in a direction moving from the shaft $N^3$, the cam $N^{51}$ will be arrested against the inside of the hook $N^{60}$.

As shown in Figs. 6 and 7 and more clearly in Figs. 1, 2 and 3, there is pivoted to each order plate $N^{53}$ at $N^{16}$, a swinging toothed detent or "carrying" segment $N^{54}$ which are adapted to mesh with the teeth of the wheels $N^{50}$ when the latter become disengaged from the racks $R^{50}$; and when the wheels $N^{50}$ are in full engagement with the racks $R^{50}$, the teeth of the wheels $N^{50}$ just clear the teeth of the segment. Each segment has a pin $N^{18}$ projecting from its side.

Each segment $N^{54}$ is under the control of two cam plates $N^{55}$ and $N^{56}$, the former being adapted to control the operation of the segment $N^{54}$ for purposes of addition, and the latter serving to control the detent $N^{54}$ for purposes of subtraction. The cam plates $N^{55}$ and $N^{56}$ are pivoted to the order plates at $N^{15}$ and each cam plate is provided with an eccentric and somewhat irregular-shaped slot which loosely embraces the pin $N^{13}$. The slot in the cam plate $N^{55}$ is so arranged that its rotation about the pin $N^{15}$ will cause the pin $N^{13}$ to move the segment $N^{54}$ toward the right, while the slot in the cam $N^{56}$ is so designed that a rotation of cam $N^{56}$ on its center $N^{15}$ will cause the pin $N^{13}$ to rotate the segment $N^{54}$ in a reverse direction, that is toward the left.

When both the cam plates $N^{55}$ and $N^{56}$ are in their uppermost position, the shape of the lower ends of the slots is such as to hold the pin $N^{13}$ in a central position, that is, in a position from which it can be moved in either direction a distance corresponding to one tooth of the segment $N^{54}$ when one or the other of the cam plates $N^{55}$, $N^{56}$, is released by the operation of the cam $N^{51}$. The cam plates $N^{55}$ and $N^{56}$ are held in their upper position by the turned-over ends of the hooks $N^{60}$ and $N^{61}$ as explained in Patent No. 1,203,863. Suitable springs $N^{87}$ cooperating with the cam plates $N^{55}$, $N^{56}$, tend to rotate them so that their upper ends will move downwardly, or, in other words, against the latched-up position which is maintained by the hooks $N^{60}$ and $N^{61}$.

A horizontal bar $N^{49}$ which has upwardly extending arms at its ends that are suitably pivoted, is normally held in retracted position by a suitable spring, not shown, and is arrested in its retracted position by engagement with shaft $N^4$. Suitable means is provided, as explained in Patent No. 1,203,863, for swinging the carrying bar $N^{49}$. The function of the carrying bar $N^{49}$ is to restore the cams $N^{55}$ and $N^{56}$ to a position where they will be latched by the hooks $N^{60}$ and $N^{61}$ after the cams $N^{55}$ and $N^{56}$ have been unlatched in the operation of "carrying."

Suitably journaled in the side frames of the machine and extending underneath the different sets of cam plates $N^{55}$, $N^{56}$, is a "shift bar" $N^{90}$ which has a longitudinal rib on its upper edge adapted to selectively engage and block all of the adding cam plates $N^{55}$ when in one position, as shown in Fig. 7, or all of the subtracting cam plates $N^{56}$ when turned to another position, as shown in Fig. 6. The shift bar is turned on its longitudinal axis according to the setting of the machine either for addition or for subtraction, by means described in Patent No. 1,203,863.

The adding cam plates $N^{55}$ are provided with projecting lugs $c$ and the subtracting cam plates with projecting lugs $d$ with which the upper ridge or rib of the shift bar $N^{90}$ engages, according to which way this bar is turned, as shown in Figs. 6 and 7. When the shift bar $N^{90}$ is turned to engage with the lugs $d$, all of the cam plates $N^{56}$ which are used to effect "carrying" when subtracting is going on, are locked so that they can have no effect upon the swinging of the detents $N^{54}$. Similarly, when the lugs $c$ of the adding cam plates $N^{55}$ are engaged by the shift bar when turned to the position shown in Fig. 7, all of the adding cam plates $N^{55}$ are locked so that they can have no effect upon the detents $N^{54}$.

When the shift bar $N^{90}$ engages the lugs $d$ of the subtracting cam plates $N^{56}$, the lower part of said shift bar engages the projections $b$ on the subtracting hooks $N^{61}$ and moves them so that their points are not engaged by the cams $N^{51}$ of the adding wheels hence they are inoperative for purposes of subtraction, similarly, when the shift bar $N^{90}$ engages the lug $c$, its lower part engages the projections $a$ on the adding hooks $N^{60}$ and positions said hooks so that the cams $N^{51}$ cannot engage them.

The description previously given affords a clear understanding of the shift bar $N^{90}$ and its purposes in connection with adding and subtracting accumulator so that the construction and operation of the locking means constituting the present invention will be clearly understood as said locking means is used for the purpose of securely holding the shift bar $N^{90}$ when it is moved to either the "adding" or "subtracting" position illustrated in Figs. 6 and 7.

My present improvements are shown in Figs. 1 to 5, inclusive, and so much of the arrangement and operation of the shift bar $N^{90}$ and carrying bar $N^{49}$ is shown as will afford a clear understanding of the principle of the invention.

Only one set of locking latches, as shown in Figs. 1 to 5 inclusive, is necessary and this set or pair may be applied to any order plate $N^{53}$ but the set is preferably applied to the order plate in the "units' position because this is most accessible, particularly if the locking latches are to be applied to a machine already manufactured. The order plates $N^{53}$, as manufactured, are each provided with a detent $N^{54}$. While this detent is not necessary in the "units" position, it is shown in Figs. 1, 2 and 3 to illustrate the relationship of the improved locking means but if the locking means is applied to any other order plate, the detent would necessarily be used on the particular order plate.

The locking mechanism comprises two locking latches $N^{70}$ and $70^N$, the former being adapted to lock the shift bar $N^{90}$ while it is set for addition as shown in Fig. 1, and the latter to lock said bar when it is set for subtraction as shown in Fig. 3. The latches are made as stampings each having a hole $h$ so that they may be pivoted on the same stud $N^{15}$ which is carried by the order plate $N^{53}$. Each latch is retracted in a counter-clockwise direction by a coil spring $N^{87a}$ connected at one end to the order plate $N^{58}$ and at the other end to the latch, separate springs being employed so that the latches are independently spring-actuated.

The latch $N^{70}$ has a hook-shaped head 1 and it is cut out or formed in such manner that the said head may hook over the rib at the top of the shift bar $N^{90}$ as shown in Fig. 1 or may be raised entirely clear of the shift bar as shown in Fig. 2, or, rest on top of the shift bar as shown in Fig. 3. The locking latch $70^N$, which is adapted to hold the shift bar $N^{90}$ against movement when in subtracting position, is provided with a head 2 which may rest on the rib of the shift bar $N^{90}$ as shown in Fig. 1 when the shift bar is set for addition, or may be held clear of the shift bar so that the latter may be set as shown in Fig. 2, or may drop down back of the rib or the shift bar $N^{90}$ as shown in Fig. 3 to lock the shift bar in subtracting position. The latches $N^{70}$ and $70^N$ are provided for locking the shift bar in either the adding or subtracting position so that it is impossible for the shift bar to accidentally move from the position in which it is set and this insures the retention of the cam plates $N^{55}$ and $N^{56}$ and the hooks $N^{60}$ and $N^{61}$ in their blocked condition, according to the setting of the shift bar $N^{90}$, until the operation of "carrying," for either addition or subtraction has been effected.

The advance of the carrying bar $N^{49}$ causes it to engage the tails 4 and 5 of the latches $N^{70}$, $70^N$, for the purpose of releasing their engagement with the shift bar $N^{90}$ so that it may be turned as shown in Fig. 2 and as the locking latch which is performing a locking action on the shift bar $N^{90}$ has its head (1 or 2) in dropped position, its tail (4 or 5) being rearwardly advanced in relation to the tail of the other latch, said locked latch is first engaged by the carrying bar $N^{49}$ and the shift bar $N^{90}$ unlocked and then both latches are held as shown in Fig. 2.

Assuming that the machine is set for addition, the shift bar $N^{90}$ will then be in the position shown in Fig. 1 and it will be locked by the head 1 of the latch $N^{70}$. When the parts are in this position, any movement of the shift bar $N^{90}$ toward the subtracting position illustrated in Fig. 3, is checked.

When the machine is set for an operation of subtraction as shown in Fig. 3, the following operation occurs: During the first 15° of the forward movement of the main drive shaft of the machine, the carrying or restoring bar $N^{49}$ moves from the position shown in Fig. 1 to the position shown in Fig. 2 which brings it into contact with the tails 4 and 5 of the latches $N^{70}$ and $70^N$. The further rotation of the drive shaft of the machine causes further advance of the carrying bar $N^{49}$ and the locking latches are then turned in a clockwise direction on their pivot $N^{15}$ against the tension of their springs $N^{87a}$ until the locking heads 1 and 2 are lifted clear of the shift bar $N^{90}$ as shown in Fig. 2, whereupon the mechanism of the machine causes the shift bar $N^{90}$ to move to the position shown in Fig. 3, which arranges it for blocking the adding cam plates $N^{55}$ and hooks $N^{60}$ and releases the subtracting cam plates $N^{56}$ and hooks $N^{61}$ so that the accumulator is conditioned to effect carrying during the operation of subtracting. Once the shift bar $N^{90}$ has assumed the position shown in Fig. 3, the head 2 of the subtracting locking latch $70^N$ drops down back of the rib on the shift bar and effectually blocks any turning of the shift bar to the adding position of Fig. 1 until the carrying bar $N^{49}$ has again advanced to the position shown in Fig. 2 which occurs on the first part of the next operation of the machine.

I claim:

1. In an adding and subtracting mechanism, the combination with accumulator wheels, or two controlling mechanisms, one for addition and the other for subtraction, a settable selector adapted for rendering one of said controlling mechanisms inoperative when the other one is operative, and means separate from said settable selector for positively locking said settable selector in its respective positions.

2. In an adding and subtracting mechanism, the combination with accumulator wheels, of two controlling mechanisms, one for addition and the other for subtraction, a settable selector adapted for rendering one of said controlling mechanisms inoperative when the other one is operative, and independent locking means each separate from said settable selector, one of which locks the settable selector when it is arranged in adding position, and the other being adapted to lock the settable selector when it is in subtracting position.

3. In an adding and subtracting mechanism, the combination with accumulator wheels, of two controlling mechanisms, one for addition and the other for subtraction, a settable selector adapted for rendering one of said controlling mechanisms inoperative when the other one is operative, means, separate from said settable selector for positively locking said settable selector in its respective positions, and means for automatically releasing the locking means when predetermined.

4. In an adding and subtracting mechanism, the combination with accumulator wheels, of two controlling mechanisms, one for addition and the other for subtraction, a settable selector adapted for rendering one of said controlling mechanisms inoperative when the other one is operative, independent locking means each separate from said settable selector, one of which locks the settable selector when it is arranged in adding position, the other being adapted to lock the settable selector when it is in subtracting position, and means for automatically disengaging the independent locking means from the settable selector when predetermined.

5. In an adding and subtracting mechanism, the combination with accumulator wheels, of two controlling mechanisms, one for addition and the other for subtraction, a settable selector adapted for rendering one of said controlling mechanisms inoperative when the other one is operative, and independent pivoted latches, one of which locks the settable selector when it is arranged in adding position, the other latch being adapted for locking the settable selector when it is in subtracting position.

6. In an adding and substracting mechanism, the combination with accumulator wheels, of two controlling mechanisms, one for addition and the other for subtraction, a settable selector adapted for rendering one of said controlling mechanisms inoperative when the other one is operative, independent pivoted latches, one of which locks the settable selector when it is arranged in adding position, the other latch being adapted for locking the settable selector when it is in subtracting position, and means for automatically disengaging the latches from the settable selector when predetermined.

7. In an adding and subtracting mechanism, the combination with a settable selector which, when in one position, conditions the mechanism for "carrying" when an adding operation is being performed and, when in another position, conditions said mechanism for "carrying" when a subtracting operation is being performed, of means, separate from said settable selector, for positively locking said settable selector in its respective positions.

8. In an adding and subtracting mechanism, the combination with a settable selector which, when in one position, conditions the mechanism for "carrying" when an adding operation is being performed and, when in another position, conditions said mechanism for "carrying" when a subtracting operation is being performed, of means, separate from said settable selector, for positively locking said settable selector in its respective positions, and means for automatically releasing the locking means when predetermined.

9. In an adding and subtracting mechanism, the combination with means for effecting "carrying," of a rockable shift bar adapted, when in one position, to condition the mechanism for "carrying" when an adding operation is being performed and, when in another position, to condition said mechanism for "carrying" when a subtracting operation is being performed, of independent pivoted latches, one of which locks the shift bar when it is set for addition, the other latch locking the shift bar when it is set for subtraction.

10. In an adding and subtracting mechanism the combination with means for effecting "carrying," of a rockable shift bar adapted, when in one position, to condition the mechanism for "carrying" when an adding operation is being performed and, when in another position, to condition said mechanism for "carrying" when a subtracting operation is being performed, independent pivoted latches, one of which locks the shift bar when it is set for addition, the other latch locking the shift bar when it is set for subtraction, and a carrying bar adapted to re-set the carrying mechanism and to release the locking latches aforesaid from the shift bar to permit re-setting of the said shift bar.

11. In an adding and subtracting mechanism, the combination with means for effecting "carrying," of a rockable shift bar adapted, when in one position, to condition the mechanism for "carrying" when an adding operation is being performed and, when in another position, to condition said mechanism for "carrying" when a subtracting operation is being performed, of independent pivoted latches, spring means operating on said latches tending to cause them to engage the shift bar, one of said latches being adapted to automatically lock the shift bar when it is set for addition, the other latch automatically locking the shift bar when it is set for subtraction, and a carrying bar adapted to engage the latches and turn them against the actuation of the spring means to release said latches from the shift bar to permit re-setting of said shift bar.

In testimony whereof I affix my signature.

FREDERICK W. BERNAU.